United States Patent

[11] 3,575,651

[72] Inventor Daniel R. Pimentel
 Seekonk, Mass.
[21] Appl. No. 746,950
[22] Filed July 23, 1968
[45] Patented Apr. 20, 1971
[73] Assignee Texas Instruments Incorporated
 Dallas, Tex.

[54] REVERSING MOTOR CONTROL SYSTEM
 16 Claims, 19 Drawing Figs.
[52] U.S. Cl................................................. 318/207,
 318/283
[51] Int. Cl.............................................. H02p 1/42
[50] Field of Search............................................. 318/207,
 207.1, 207.2, 207.3, 283

[56] References Cited
 UNITED STATES PATENTS
2,701,855 2/1955 Hammes....................... 318/207
2,762,004 9/1956 Shepardson.................. 318/207
2,851,646 9/1958 Williamson................... 318/207
3,090,900 5/1963 Porter et al.................... 318/207
3,401,892 9/1968 Meyers.......................... 318/207X Primary Examiner—Benjamin Dobeck
Assistant Examiner—Gene Z. Rubinson
Attorney—Koenig, Senniger, Powers & Leavitt ABSTRACT: An electromagnetic relay or contactor operates to change the relative polarities of the start and run windings of a reversible AC induction motor thereby to reverse the direction of motor rotation upon successive motor starts. The motor drives a reversibly operable garbage disposal unit or the like. After the motor has started in either direction, its start winding is cut out of circuit and it continues to run on excitation of its run winding in the direction in which it started. The circuitry for connecting the motor to an electrical power source includes a manual-reset current-responsive overload circuit breaker to disconnect the motor upon the occurrence of certain overload conditions such as extended inrush of motor current accompanying locked-rotor conditions. Upon resetting of the thermostatic breaker the motor restarts in reverse. Means is also provided whereby under increased motor currents, such as caused by motor-speed-reducing, dragging overloads, the relay will reexcite the start winding without change of direction of current therethrough, whereby the driving torque of the motor is increased without change in its direction of rotation.

U.S. Pat No. 820,119 indicates the field of one aspect of the invention.

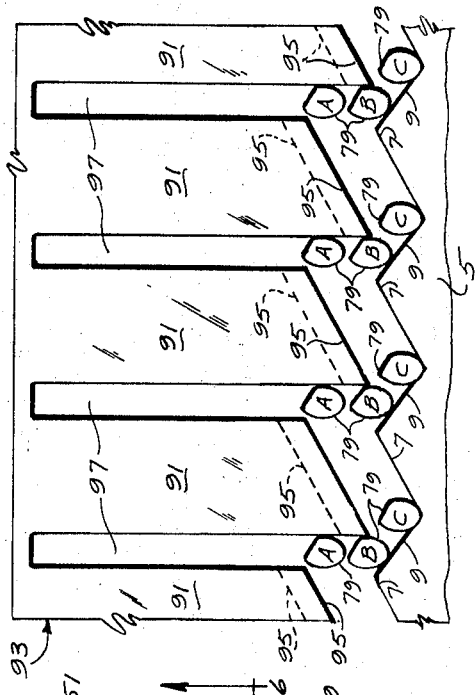

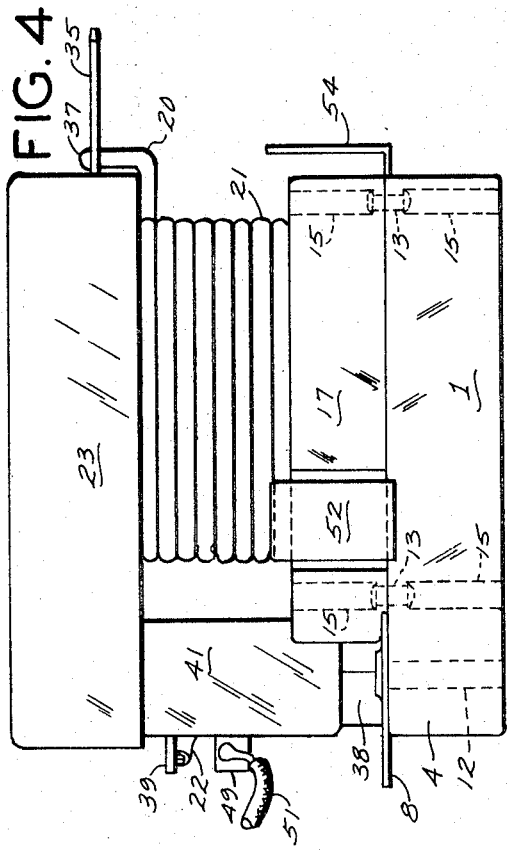

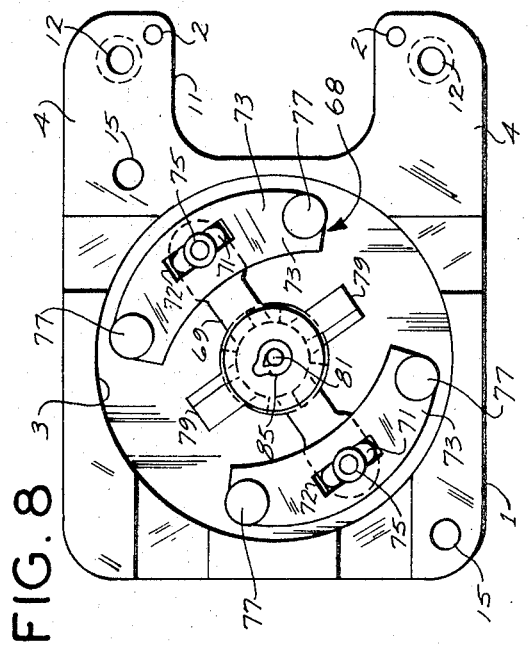
FIG.8
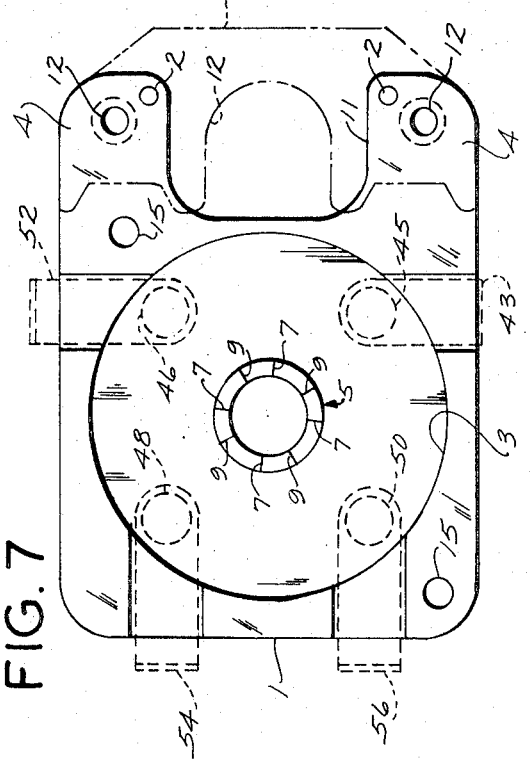
FIG.7
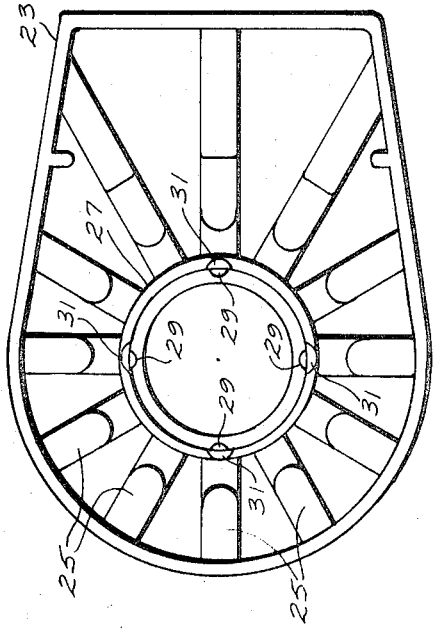
FIG.10
FIG.9

REVERSING MOTOR CONTROL SYSTEM

While the invention in some aspects has general applications, a primary application is to form a drive for domestic garbage disposal units, as to which it has the following advantages:

a. More evenly distributed cutter wear is obtained in the driven disposal unit, thereby prolonging cutter life;

b. Cutter jams are more readily overcome;

c. Dragging overload torques on the motor are automatically met by increased motor torque without reversing rotation, thus conserving angular momentum;

d. A compact control unit is provided for convenient attachment to a disposal unit in cramped quarters;

e. Upon each reapplication of AC power to the motor it reverses its direction of rotation;

f. The unit is safe to operate.

Referring to the drawings,

FIG. 1 is a much-enlarged front elevation of a unit embodying the invention;

FIG. 2 is a plan view of FIG. 1;

FIG. 3 is a right-hand end view of FIG. 1;

FIG. 4 is a rear elevation of FIG. 1;

FIG. 5 is a right-hand end view of FIG. 4 and left-hand view of FIG. 1;

FIG. 6 is a vertical section, partly in elevation, taken on line 6—6 of FIG. 2 and showing a contacts-closed position of parts;

FIG. 6A is a view like FIG. 6 but fragmentary, and showing a contacts-open position of parts;

FIG. 6B is a view like FIG. 6A but showing another contacts-open position of parts;

FIG. 7 is a plan view of a base part from which superposed parts have been removed, the dotted lines showing locations of certain contacts and a mounting plate as affixed upon assembly;

FIG. 8 is a view similar to FIG. 7 but showing an inserted movable-contact assembly in the open-circuit position of FIG. 6B, the fixed contacts being omitted;

FIG. 9 is a bottom view of a cover per se, other parts removed;

FIG. 10 is a further enlarged view of a stepping cam and its driving member removed from other parts;

FIG. 11 is a development in the drawing plane of certain parts, illustrating their actions according to their positions illustrated in FIGS. 6, 6A and 6B;

Similar reference characters indicate corresponding parts throughout the various views of the drawings.

Figure 12:
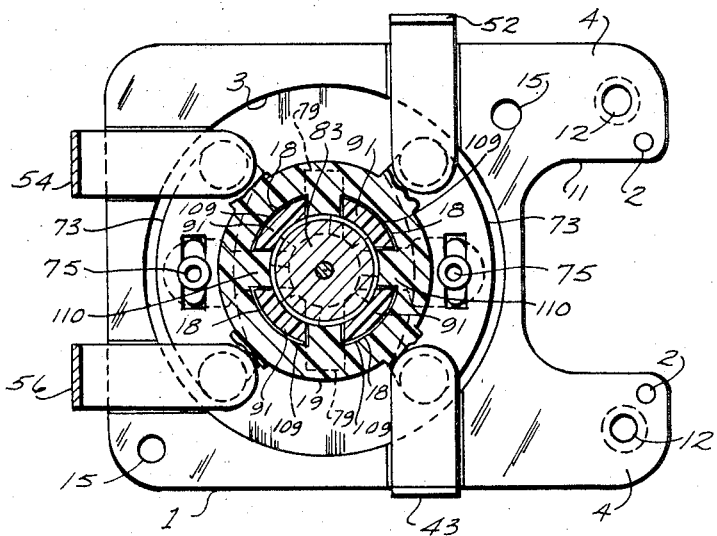
FIG. 12 is a horizontal section taken on line 12-12 of FIG. 6, parts having been removed.

Referring more particularly to FIGS. 1—7, there is shown at numeral 1 an insulating base. Formed in a circular hollow portion 3 of base 1 is a crown-shaped base cam 5 which is in the form of upwardly directed points 7 between which are formed notches 9. The sides of the notches 9 are unsymmetrical.

An exterior recess 11 is formed between arms 4 extending from the base 1. Depressions 2 on the arms 4 extending from the base 1. Depressions 2 on the arms 4 receive bosses 6 in a supporting plate 8 (FIGS. 1, 3 and 7). The plate 8 has threaded holes 10 for the reception of holding screws (not shown) extending from a disposal unit to be controlled. The screws extend through holes 12 in the base 1.

Rivets 13 in registered holes 15 are employed to hold a body 17 on the base 1. The body 17 has a form which includes an upwardly extending tubular spool 19 (FIG. 6) around which is axially wound an electromagnetic coil 21. Carried on the upper end of the spool 19 is an enclosing cap 23, webbed on its inside as shown at 25 (FIG. 9). From a central ring portion 27 of the cap 23 extend slightly spring lugs 31 carrying bumps 29, which upon application of the cap 23 to the upper end of the spool 19 bring about a snap connection between the bumps and receiving holes 30 therefor in the upper end of the spool 19. Carried in a recessed portion of the cap 23 and around the lugs 31 and above the coil 21 is a comparatively thick ring 33 composed of a sufficient amount of flux-concentrating ferromagnetic material for substantially concentrating the toroidal flux field issuing from the coil 21 at its upper end. Below the ring 33 and above coil 21 is an insulating washer 34. Extending from the ring 33 is a conductive terminal 35.

Connnected to the terminal 35 is one end 20 of the coil 21, attached as shown at 37. The other end lead 22 of the coil 21 extends to a terminal 39 of a manual-reset current-responsive overload circuit breaker 41, of the thermostatic type as shown. It includes a heater 36 (FIGS. 14—17) and is of known type. Therefore further description is not required for those skilled in the art.

End lead 22 of the coil 21 is also connected at 24, by soldering or the like, to a terminal 43 extending from an internal contact 45 within the housing formed by the parts 1 and 17. The other terminal 49 of the breaker 41 is connected to a conductor 51 which extends to one side L-1 of a power source indicated at L-1, L-2. In the line side L-1 is a conventional manually operable line switch 53.

Structurally the casing of the circuit breaker 41 is held in captive position between appropriate recesses in the cover 23 and the body 17. Its manual reset button 59 becomes located in position in the recess 11 between side extensions 4, being thus shielded against damage from side blows. A notch 12 in mounting plate 8 accommodates the part 14 of breaker 41 which carries the button 59.

Other fixed internal contacts in the recess 3 of member 1, in addition to fixed contact 45 above mentioned, are numbered 46, 48 and 50. These have external terminals 52, 54 and 56 respectively. Fixed contacts 45, 46, 48 and 50 face downwardly in the recess 3, being spaced at 90° intervals on a circle.

It will be seen from the above and FIGS. 14—17 that the power source is connected through switch 53, circuit breaker 41 and coil 21 to a run winding 65 of a reversing AC induction motor M. Motor M drives the conventional cutter or grinder elements of a reversible garbage disposal unit (not shown) and upon which the present stepping relay or contactor is adapted to be mounted. Side L-2 of the power source is connected to the other end of the run winding 65 via terminal 54. Terminal 52 is connected to the one end of the start winding 67 of the motor M. The other end of the start winding is connected to terminal 56. In order to reverse the operation or direction of rotation of the motor M, relative polarities of the start winding 67 and the run winding 65 are reversed. The manner and arrangement for consecutively accomplishing this upon successive motor starts will next be described.

Referring more particularly to FIGS. 6, 6A, 6B, 8 and 14-—17, there is shown at 68 a movable contact assembly including a supporting cross arm 69 composed of insulating material having endwise lugs 71 located loosely in slots 72 formed in arcuate conductive segments 73. A rivet 75 is inserted in each lug 71 with clearance between the rivet head and the respective segment 73. Thus, the conductive segments 73 are held captive but may rock a limited amount transversely on the ends of the cross arm 69. Carried on the ends of the conductive segments 73 are respective pairs of electrically interconnected movable contacts 77, which are also spaced at 90° intervals around a circle.

Extending perpendicularly from the center of cross arm 69 are opposite portions of a cam follower arm 79 for cooperation with the crown cam 5 in the cup 3 of base 1. The arms 69 and 79 form a cruciform support from which a central post 81 extends upwardly for slidably carrying a lower magnetizable sleeve-shaped core or armature 83. A shoulder piece 85 is crimped to the upper end of the post 81 and a compression spring 87 is interposed between it and the sliding lower core 83.

Figure 13:
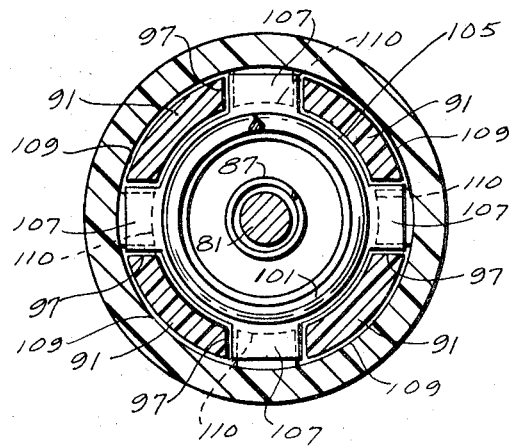
FIG. 13 is an enlarged fragmentary horizontal section taken on line 13-13 of FIG. 6.

The hollow inside of the spool 19 is formed with four longitudinal grooves 18 between splines 110 (see FIG. 12) for the sliding reception of four tines 91 of a vertically movable cylindrical stepping cam 93. Cam 93 is shown much enlarged in FIG. 10, its generally cylindrical form being diagrammatically developed in the drawing plane in FIG. 11. Cam 93 is composed of insulating material. The lower ends of its tines 91 are provided with sloping or beveled ends 95 each leading into one of four longitudinal slots 97 between the tines 91. The upper end of the cam 93 is terminated by a cup-shaped portion 99 within which is located a spring 101 reacting from a shoulder 103 at its upper end and against a supporting washer 105 at its lower end (see FIGS. 6 and 13). The washer is formed with lugs 107 (FIG. 13) which extend through the slots 97 and rest upon the upper ends of the splines 110 within the spool 19. Thus the tines 91 of cam 93 can slide past the washer 105 and through slots 18 on the inside of spool 19. The spring 101 drives or biases the cam 93 upwardly when coil 21 is deexcited. In order that it may be driven down when the coil 21 is excited, there is provided around the top of cam 93 a magnetizable sleeve which rests on a shoulder 113 and forms an upper magnetizable core or armature 111.

Contact assembly 68 is both rotatable and vertically or axially movable, being formed by cross arm 69, follower 79, rockable conductive segments 73 including the movable contacts 77 thereon, the post 81 with the shoulder piece 85, the lower magnetizable armature core 83, and the spring between it and the shoulder 85. Another compression spring 86 reacts between washer 105 and core piece 83 to apply a downward biasing force on it.

The stepping cam 93 with its connected upper magnetizable core piece or armature 111 may be referred to as an axially movable stepping cam assembly for effecting stepwise rotation of the movable contact assembly 68 when under certain conditions the two cores and their associated assemblies are drawn together by the magnetic field of winding 21 upon excitation of the latter.

Figure 14:
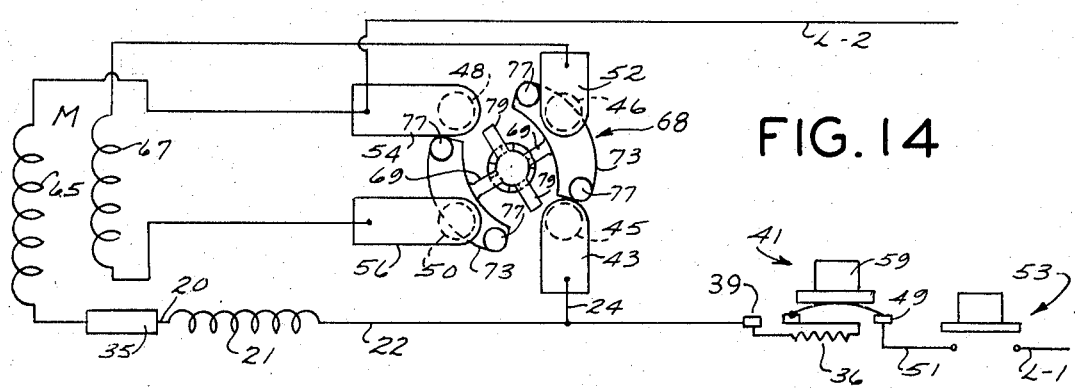
FIGS. 14—17 are circuit diagrams illustrating operating events.
Figure 16:
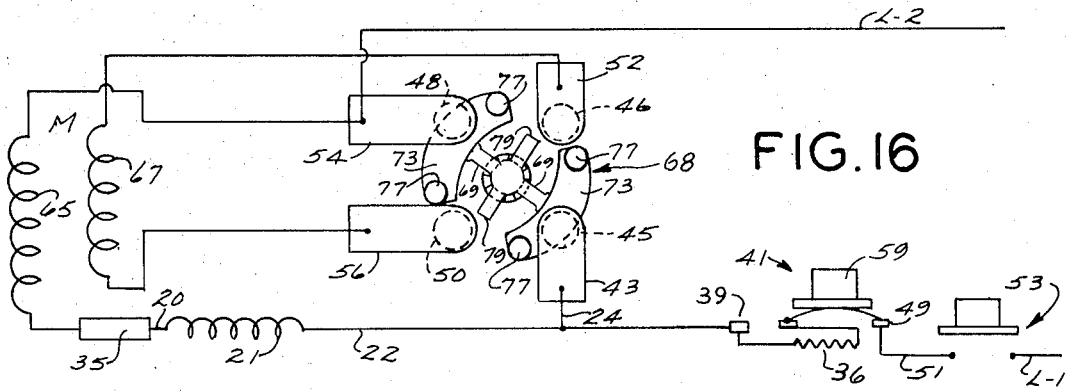

Three positions of the follower 79 are labeled A, B and C in FIGS. 6, 6A, 6B and 11. When the coil 21 is deexcited, the movable contact assembly is caused to drop under bias from the spring 86 and gravity. The stepping cam 93 is forced up by the spring 101 reacting from the washer 105. This moves up the angled ends 95 of tines 91 as shown in FIG. 6B and by the dotted positions as in FIG. 11. Under these conditions the follower 79 is dropped into engagement with the fixed cam 5, by which the follower is rotated by engagement with the shorter sides of the unsymmetrical notches 9, moving from position A, through B to C. This locates the follower 79 under the sloping portions 95 of the stepping cam 93 which at this time is up (see FIG. 6B and the dotted line positions of the angled tine ends 95 in FIG. 11). This is preparatory to the next excitation of or reapplying of power to the coil 21 to start the motor M. Thus C in FIGS. 6B and 11 indicates the lowermost rest position of follower 79 on cam 5 corresponding to an angled position of the then-open contacts 77 (FIGS. 6B, 8 and 14). Two different angular aspects of this angled open-circuit rest condition are shown in FIGS. 14 and 16. It will be understood that such a position can be reached only when the angled surfaces 95 of stepping cam 93 are retracted upwardly (FIG. 6B), i.e., to their dotted line positions shown in FIG. 11. Only then can follower 79 move through position B (FIG. 6A) to position C (FIG. 6B).

When the coil 21 is again excited, as by closing switch 53, movable contact assembly 68 is pulled up by upward magnetic pull on its core 83 and cam 93 is forced down by a magnetic action on its core 111 (see FIG. 6 and solid-line position in FIG. 11). This results in engagement between the follower 79 and the depressed angled surfaces 95 of stepping cam 93. This causes the rising movable contact assembly to turn or rotate as follower 79 engages opposite angled surfaces 95. This continues until opposite ends of the follower 79 are elevated from the angled rest position C on cam 5 to elevated positions A in the lower ends of slots 97 (see FIGS. 6B and 6, in that order, and FIG. 11). This resiliently engages movable contacts 77 under and with fixed contacts 45, 46, 48 and 50. The two possible angular aspects of this contacts-closed condition appear in FIGS. 15 and 17. The rocking and resilient engagements provide for equal contact pressures. The conductive segments 73 rock on the ends of the insulating bars 69 and spring 87 provides resilient action.

A typical sequence of events is illustrated in FIGS. 14—17. FIG. 14 illustrates connections and conditions wherein the coil 21 has been deexcited (line switch 53 open). The movable contacts 77 have dropped away from the fixed contacts 45, 46, 48 and 50 and follower 79 has dropped onto the fixed cam 5 with some rotation (see position C of follower 79 in FIGS. 6B and FIG. 11). The motor M is deexcited and at rest.

Figure 15:
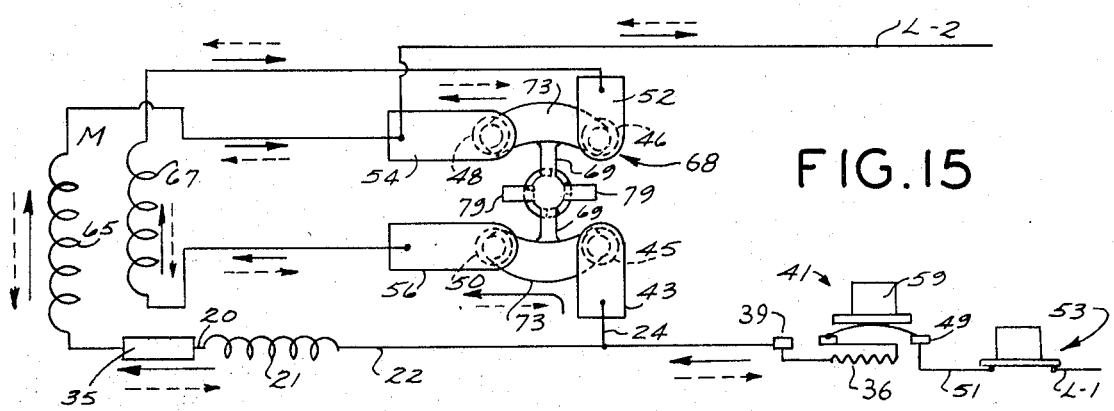

Referring to FIG. 15, it shows an excited condition of the coil 21 (switch 53 closed). The follower 79 has been lifted up from cam 5 and turned by engagement with the then-depressed angled ends 95 of the tines 91 and cam 93. The closed-circuit condition shown in FIG. 15 then occurs in which the movable contact assembly has been drawn up axially from the position it had in FIGS. 6B and 14 and turned so as to register pairs of lifted contacts 77 to effect connections across the fixed contact pairs 46, 48 and 45, 50 (FIGS. 6 and 15). The initial rush of high starting AC current through the parallel-connected run and start windings will then be (on an instantaneous basis) as shown by the pairs of solid and dotted darts in FIG. 15. In other words the polarities of the windings are the same. This excites the motor to drive a disposal unit in one direction after lifting of the follower 79 to position A in FIGS. 6 and 11. After the rotor of motor M reaches running speed, the current through winding 65 and coil 21 subsides to a much lower level during which normal running motor currents flow through coil 21, thereby permitting follower 79 to drop to the trapped position B (FIGS. 6A and 11). This is due to the fact that the running motor current, being less than its starting current, weakens the flux field of coil 21 so that it is insufficient to hold up the lower core piece 83. However, in view of the flux concentrating ring 33, these normal run current levels are sufficient to hold down the upper core piece 111 and cam 93. Thus contacts 77 are reopened as shown in FIG. 6A, cutting the start winding 67 out of circuit. The motor continues to run on its run winding 65 in the direction in which it originally started. Thus contact assembly 68 is moved to a first position (FIG. 15 and A in FIG. 11) during flow of starting current through coil 21, and then moves downwardly to a second position after the current through coil 21 fails to values between first and second predetermined levels represented generally by normal running currents through winding 65 and coil 21.

When the coil 21 is next deexcited, as by manually opening the switch 53 or by overload current conditions opening breaker 41, the assembly 68 moves to a third position or mode as shown in FIG. 16. In this case again, as in FIG. 14, the movable contact assembly has dropped so that the follower 79 has engaged the cam 5 to step around to a new open-circuit angled position as illustrated. The contacts are open as in FIG. 6B, but they have a different angular position (compare FIGS. 14 and 16).

Figure 17:
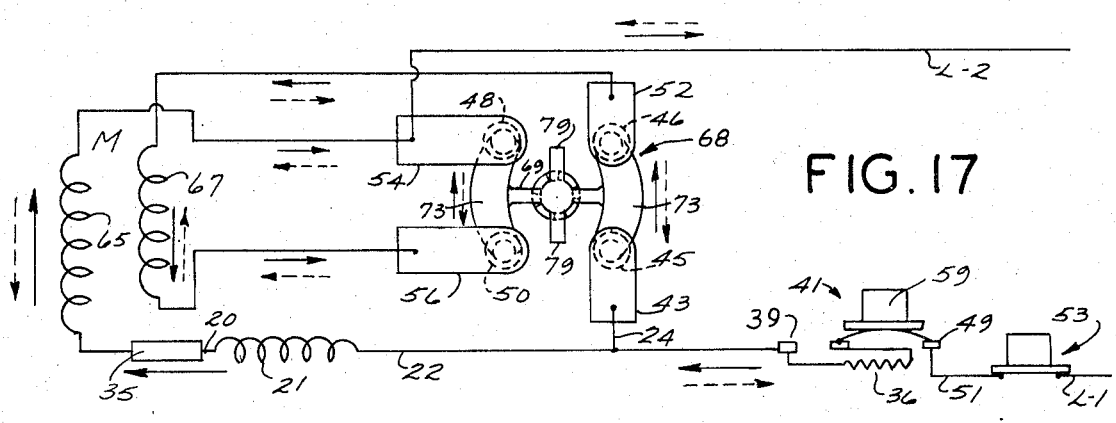

Upon the next excitation of or reapplication of power to coil 21 (switch 53 reclosed) the movable contacts 77 will move to a fourth position to again engage the fixed contacts but this time to connect members of the pairs 45, 46 and 54, 56 as shown in FIG. 17 wherein the members of the fixed pairs of fixed contacts 45, 46 and 48, 50 are interconnected by pairs of contacts 77 respectively during motor starting current conditions and then reopened under the diminished normal running current conditions to cut out or disconnect the start winding, assuming a fifth position as indicated at B in FIG. 11 and with contacts open but aligned as in FIG. 17. But in this case the instantaneous directions of current flow through the motor windings 65 and 67 when both are excited will be opposite to that illustrated in FIG. 15, i.e., the windings 65 and 67 will be connected in opposed polarity and instantaneous current flow will be as represented by the pairs of solid and dotted darts in FIG. 17. In other words, the polarities of the windings are reversed relative to those shown in FIG. 15. This results in the motor running in a direction reverse to that in which it ran under the FIG. 15 prior excited conditions. This reversal of direction upon each start under normal operating conditions evens wear on the cutters of a garbage disposal with increased in their useful lives.

In accordance with this invention it will be noted that whether the power source is disconnected from the motor and stepping relay, either by opening of switch 53 or the opening of breaker 41 under overload current conditions, reapplication of power by reclosing switch 53, or by manually resetting breaker 41 by actuating reset button 59, will cause motor M to restart in a reversed rotation direction assuming the motor has slowed sufficiently upon reapplication of the power. In the latter instance the resulting reverse restart tends to back the cutters away from a jammed position causing the overload so that the jam may in many instances be cleared under the backing-off action accomplished by reverse rotation.

It is to be understood that overload conditions which will open breaker 41 include not only high current conditions (such as due to a locked rotor) existing for a relatively brief period of time, but also conditions where the current flow is such that unless the motor is deexcited it will eventually overheat after a relatively long period of time, i.e., an ultimate trip condition.

Under certain conditions, such as during a dragging overload on the motor for duration and current parameters insufficient to trip breaker 41, the motor will slow down and not effect proper operation of the garbage disposal unit or the like. Excessive running currents will flow through coil 61 under such a condition, and the present invention has a further advantage in operating automatically to increase the motor torque under those conditions. Under normal running current conditions follower 79 is held captive at position B because cam surfaces 95 are in their lower or solid-line positions (FIGS. 6A and 11). Thus cam 95, its armature 111 and cam followers 79 constitute means for preventing rotation of contact assembly 68 while the motor is operating in either of the two (forward and reverse rotation) running conditions. The contacts are then open and the start winding deexcited. As motor M operating on its run winding slows down under such a situation, the current drawn by it rises above a first predetermined level to increase the field of coil 21 sufficiently to pull up core 83 to reclose contacts 77 as shown in FIG. 6. But since the follower 79 has been withheld from cam 5 (position B), the contact assembly will not have rotated from a FIG. 15 to a FIG. 16 position (or from a FIG. 17 to a FIG. 14 position). As a consequence there will be no change in the polarity or connections between the motor windings and the power source. What occurs is simply reestablishment in circuit of the start winding without change in the direction of motor rotation. The reinstated flow of current through the start winding 67 aids winding 65 in providing extra torque to overcome the dragging load. This feature of meeting such conditions without motor reversal is of importance, since it conserves the angular momentum of rotating parts to help clear a partial or light jam. Without this feature, light jams (as well as the rotor-locking jams above mentioned) would result in motor reversal. This would involve the intervening stopping of the rotating parts with loss of their momentum. With the aid of this momentum, light jams may be cleared promptly. When this type of overload condition terminates, reduced normal running motor current again allows follower 79 to drop to the trapped position B (FIG. 11) which again cuts out the start winding while leaving the motor running normally without change of direction. This action can repeat if a further dragging overload occurs.

The use of two oppositely moving cores or armatures 83 and 111 operated by one electromagnetic winding or coil 21 results in a compact control unit, taken as a whole. By the use of the two movable core pieces (instead of a single one), each of which is movable to approach toward and recede away from the other, an adequate relative stroke length is obtained for effecting relay action; but movement of each, relative to the coil, is a fraction of its movement relative to the other. Hence the magnetomotive force required of the coil becomes smaller so that the coil and the apparatus may be more compactly constructed for convenient attachment to small apparatus in cramped quarters. The use of the flux concentrating ring 33 is an aid in this respect.

By having the current-responsive breaker 41 of the manual reset type (as distinguished from an automatic reset type), the safety of the apparatus for garbage disposal unit control is increased. That is, the motor cannot automatically restart, as would be the case with an automatic reset breaker, when the user may be trying to clear a jam that caused the overload.

In view of the above, it will be seen that lower core 83 may be referred to as a first core and the upper core 111 as a second core. As to the circuitry, it may be referred to by sections, i.e., a first section comprising the terminals 43, 52, 54, 56 with their fixed contacts 45, 46, 48 and 50, with appropriate terminal wires for connection to the start winding 67 and to the second section. The second section is constituted by the coil 21 with the wiring to place it in series with the run winding across the power source L-1, L-2, with or without the circuit breaker 41. The combination of the coil 21, the biased cores 83 and 111, the fixed contacts and the contact assembly 68 is thus a stepping relay or contactor.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. An electrical control system for connecting an AC power source including a switch, with a reversible AC motor having a run winding and a start winding for motor reversal by reversal of relative polarities of said start and run windings, comprising:

means responsive to motor starting current for changing the relative polarities of the motor windings upon successive closures from open positions of said switch to reverse the motor upon each start thereof and responsive to motor running current automatically to disconnect the start winding after each start, and means for reconnecting the start winding without motor reversal to increase the motor torque for overcoming a dragging overload while the motor is running, said last-said means being responsive to an increase in motor current to a level substantially greater than said running current.

2. A control system according to claim 1, including a manual-reset circuit breaker responsive to overload motor currents to disconnect and maintain disconnected both motor windings until the circuit breaker is manually reset.

3. An electrical control system for connecting an AC power source including a switch, with a reversible AC motor having a run winding and a start winding for motor reversal by reversal of relative polarities of said start and run windings, comprising:

electromagnetic means including a coil connected in series with said switch and the run winding and including first and second magnetizable cores movable to approach one another from outward starting positions to inward positions in a first case in which the coil is fully excited by starting current, means for biasing only the first core to recede to its outward position in a second case in which the coil is excited by normal running currents, and means for biasing both the cores to recede from one another to their outward positions in a third case in which the coil is deexcited.

4. A control system according to claim 3, including a manual-reset circuit breaker responsive to overload motor currents to disconnect and maintain disconnected both motor windings until the breaker is manually reset.

5. Reversing control apparatus for a reversible AC motor having a run and a reversibly connectable start winding for reversible operation, comprising;

control circuitry containing first and second sections connectable simultaneously with a power source, said first section containing fixed contacts arranged for selectively effecting reversed connections with the start winding of the motor, an electromagnetic coil in said second section connectable with said run winding, movable first and second cores biased to be responsive (a) to deexcitation of the coil to move to first positions respectively, (b) to motor starting current in the coil to move against the bias to second positions respectively, and (c) to normal motor running currents in the coil to release only the first core for biased movement to its first position, a movable contact assembly and a cam follower carried rotatably by the first core for movements to and from said fixed contacts to connect both the start and run windings while starting current flows through the coil and disconnect the start from the run winding when normal running currents flow therein, a stepping cam carried by the second core-shaped so that when both cores move to their second positions upon excitation of the coil by motor starting current in the coil the cam and the follower will engage to rotate the contact assembly to effect reversal of start winding connections of the fixed contacts to the start winding upon each motor start, said stepping cam being additionally shaped so that when the second core is held in its second position and the first core moves toward its second position in response to excessive running current in the coil, said additional shape will block the contact assembly against rotation as it moves toward the fixed contacts, whereby the run winding is reconnected without motor reversal under excessive motor running currents in the coil.

6. Reversible motor control apparatus for a reversible AC motor having a run and a reversibly connectable start winding for reversible operation, comprising control circuitry containing first and second sections connectable simultaneously with a power source, said first section containing fixed contacts arranged for effecting reversed connections with the start winding of the motor, an electromagnetic coil in said second section connectable with said run winding, said coil having flux concentrating means at one end, first and second cores axially movable in the coil, the second core being subject to action of said flux concentrating means, said cores being biased apart to be responsive (a) to deexcitation of the coil to separate to nonadjacent first positions respectively, (b) to motor starting current in the coil to approach each other against the bias to second adjacent positions respectively, and (c) to normal motor running currents in the coil to release only the first core for biased movement to its first position and away from the second position of the second core, a movable contact assembly and a cam follower carried by the first core for axial and rotary movements to and from said fixed contacts to connect both the start and run windings while starting current flows through the coil and disconnect the start from the run winding when normal running currents flow therein, a stepping cam carried by the second core and movable thereby, said stepping cam being in the form of a cylinder having axial slots to form tines having end bevels so that when both cores approach their second positions upon excitation of the coil with motor starting current the follower and said beveled ends will engage to rotate the contact assembly to effect change of start winding connections of the fixed contacts with the start winding upon each successive motor start, the axial slots of said stepping cam receiving the follower when the second core is held in its second position under influence of said flux concentrating means and the first core moves from its first position toward its second position in response to excessive running currents thereby blocking the contact assembly against rotation as it moves toward the fixed contacts so that the run winding is reconnected without motor reversal under excessive motor running currents in the coil.

7. Control apparatus according to claim 6, including a manual reset circuit breaker in said second section of circuitry responsive to overload motor currents to disconnect the circuitry from the power source so as to disconnect and maintain disconnected both motor windings until the circuit breaker is manually reset.

8. Control apparatus according to claim 6, wherein the contact assembly is resiliently mounted on the first core to provide for compensating contact pressures on the fixed contacts.

9. Control apparatus according to claim 6, including a spool around which said coil is wound, said spool having internal splines located in said slots of the stepping cam to guide it for axial movements, and including a second cam engageable by said follower partly to rotate the contact assembly upon contact opening movement of the follower under conditions (a) and (c) thereby to place the follower opposite said bevels on the tines before approach actions therebetween.

10. Control apparatus according to claim 9, including a manual reset circuit breaker in said second section of circuitry responsive to overload motor currents to disconnect the circuitry from the power source so as to disconnect and maintain disconnected both motor windings until the circuit breaker is manually reset.

11. A reversible motor control device comprising a base, a stationary lower crown-shaped cam on the base, four upper fixed contacts above said cam, a connected body above the base formed as a tubular spool the inside of which has four axial splines between which are four intermediate axial grooves and above which splines the inside of the spool is cylindrical, a cap on the spool, an upper magnetizable core axially movable in the upper part of the spool, upward biasing means for the core, an electromagnetic coil wound around the spool, flux concentrating means at the upper end of the coil and spool adjacent the upper core to drive and hold down the upper core against its bias in response to both motor starting and running currents in the coil, a lower magnetizable core movable at the lower end of the spool and coil within the splines, downward biasing means for the lower core, said core being adapted to be drawn up by motor starting current in the coil but under its bias to drop under motor running current in the coil, an upper axially movable cylindrical stepping cam connected with said upper core and axially driven thereby, said cam having slots forming tines extending through said grooves past the lower core and terminating downwardly in beveled ends, a movable contact assembly including four resiliently supported contacts on the lower core, said contact assembly including a cruciform support having follower means and transversely rockable conductive members each of which carries a pair of lower electrically connected movable contacts for successive engagements with pairs of the upper fixed contacts, said bias on the lower core biasing the contact assembly downwardly in a direction to separate the lower movable contacts from the upper fixed contacts upon deexcitation of the coil or the flow of motor running current, said follower means being movable into the upper cam slots during flow of starting current through said coil to draw down the upper cam, whereby when the lower core is drawn up by dragging overload coil current in excess of normal running current the follower will move axially in the slots without rotating the contact assembly to close the lower contacts on the upper contacts without stepping action, said follower upon deexcitation of the coil being engageable with said lower cam when said contact assembly drops to turn the contact assembly to place the follower means in position opposite said beveled ends of the tines of the stepping cam, the coil when then excited with motor starting current drawing down the upper core while lifting the lower core thereby to effect engagement between its beveled ends and the rising follower, whereby the movable contacts are stepped into registration with different upper contacts from those which were engaged with lower contacts when the contact assembly last made contact.

12. A control device according to claim 11, including a manual reset circuit breaker connected in series with the coil to disconnect the coil in response to overload motor currents, said breaker being held in place between said cap and said body, an operating button for the breaker, said base having extensions forming a protected space in which said button is located.

13. Motor reversing apparatus comprising pairs of fixed contacts, an axially wound electromagnet, a pair of axially movable magnetizable cores located within the field of the electromagnet for magnetically induced approach movements between them when the electromagnet is excited, means for effecting recessive movements between the cores when the electromagnet is deexcited, a movable assembly including pairs of electrically interconnected contacts, said assembly including a cam follower, the assembly being linearly driven in one direction by one core in approach movements, a nonrotatable stepping cam driven linearly by the other core in the opposite direction during approach movements, said follower upon approach movement of the assembly engaging with the stepping cam to rotate the assembly, said stepping cam being shaped to step said assembly and locate the movable contacts thereon in successive contact positions with respect to the fixed contacts, a stationary cam engageable by said follower upon recessive movements to rotate the assembly into rest positions in which the fixed and movable contacts are separated and become prepared for approach movement during which the follower will engage the stepping cam to rotate the movable contacts and engage them in advanced positions with respect to the fixed contacts.

14. A switch according to claim 13, wherein said assembly comprises a member to which the follower is rigidly attached and to which said interconnected contacts are flexibly attached, the assembly being resiliently connected with the core which drives it.

15. A system for controlling the operation of a reversible AC motor having a start winding and a run winding and a rotor, comprising a stepping relay including armature means, an electromagnetic coil for actuating said armature means connected in series with said run winding across a pair of AC supply terminals and a plurality of contacts movable by said armature means to a plurality of positions in response to the excitation level of said coil, said contacts having a first position connecting said start winding in a first polarity relationship with said run winding to drive said rotor in one direction, said contacts having a second position in which said start winding is disconnected from said run winding, means for maintaining said contacts in this latter position while the current drawn through said relay coil by the run winding remains between a first higher predetermined level and a second lower predetermined level, said contacts having a third position in which said contacts are in a shifted position relative to their said second position and said start winding remains disconnected, said contacts having a fourth position connecting said start winding in a second polarity relationship with said run winding to effect concurrent energization of said run and start windings to drive said rotor in a reverse direction, said contacts having a fifth position in which said start winding is disconnected from said run winding, and means for maintaining said contacts in this position while the current drawn through the coil by the run winding remains between said first and second predetermined levels, said contacts having a sixth position in which said contacts are in a shifted position relative to their said fifth position and said start winding remains disconnected, whereby upon initial energization of said terminals by said power source the run winding will draw current through said coil in excess of said first higher level and the armature means will move said contacts into said first position thereby establishing said first circuit and initiating operation of said motor rotor in said one direction, said current decreasing to a value between said first and second levels when said rotor reaches a running speed and thereby permitting said contacts to assume said second position; whereby if the run winding current again increases above said first level the contacts will be actuated by the armature means to return to said first position to reconnect said start winding with the run winding and increase the driving torque of said rotor; whereby if the current flow through the coils falls below said second lower level the armature means permits said contacts to move into said third position; and whereby upon reexcitation of said run winding said run winding will draw current through said coil in excess of said first level and the armature means will operate to move said contacts to said fourth position and initiate operation of said rotor in said reverse direction.

16. A system as set forth in claim 15, wherein said means for maintaining said contacts in second and fifth positions include cam means carried by a magnetizable armature core axially and rotatably movable in said coil in response to changes in current flow through said coil.